UNITED STATES PATENT OFFICE.

FREDERICK CREMER, OF CHICAGO, ILLINOIS, ASSIGNOR TO EDWARD E. McMORRAN AND WILLIAM S. TIFFANY, OF CHICAGO, ILLINOIS.

ANTIFREEZING CHARGE FOR FIRE EXTINGUISHERS.

1,410,735.   Specification of Letters Patent.   Patented Mar. 28, 1922.

No Drawing.   Application filed July 5, 1919. Serial No. 308,871.

*To all whom it may concern:*

Be it known that I, FREDERICK CREMER, a citizen of the United States, residing at Chicago, in the county of Cook and State of Illinois, have invented certain new and useful Improvements in Antifreezing Charge for Fire Extinguishers, of which the following is a specification.

This invention has reference to a charge for chemical fire extinguishers, and aims to provide a charge which will not freeze at any temperature to which the extinguisher would be subjected in normal use.

In extinguishers of this character it has been heretofore customary to employ a charge consisting of two portions, one of which comprises an alkali metal carbonate and the other an acid, so that when the two charges were brought together the chemical reaction would result in the production of a large quantity of $CO_2$, the pressure of which would cause the liquid to be delivered from the extinguisher with considerable force, so that it would be thrown to some distance upon the fire. Sodium carbonate is usually employed for the base portion of the charge, but the sodium carbonate solution freezes at a temperature only slightly lower than the freezing point of water, consequently these extinguishers could not be used in extremely cold climates.

Calcium chloride has a freezing point sufficiently low to meet any condition to which a fire extinguisher would be subjected, and I therefore prefer to employ this solution as the carrier for the base portion of the charge, although other chloride salts might be employed in some instances if preferred. As the active base or reagent of the charge I employ calcium carbonate, which does not combine chemically with the calcium chloride, and which will therefore be carried to a large extent in suspension in the calcium chloride solution. I have found that calcium carbonate best meets the requirements and conditions existing in fire extinguishers, but other carbonates of the alkaline earth metals, and even the carbonates of some of the other metals, which would not chemically react with calcium chloride, might be employed in some instances, if preferred.

The other portion of the charge consists primarily of an acid, and I have found that hydrochloric acid is best suited to the requirements, since it does not chemically react upon the calcium chloride to produce an insoluble precipitate which would clog the delivery orifice of the extinguisher and also diminish the required amount of pressure producing $CO_2$. The hydrochloric acid acts directly upon the calcium carbonate and very quickly liberates sufficient $CO_2$ to produce an extremely high pressure within the extinguisher which will force the liquid out upon the fire. While exhaustive tests have convinced me that hydrochloric acid is best for the required purposes, I appreciate that other acids which would not produce an insoluble precipitate in the presence of calcium chloride might be employed instead, without exceeding the scope of my invention.

In practice the larger container or receptacle of the extinguisher is charged with the base portion of the charge, consisting of the calcium chloride carrying the calcium carbonate in suspension, and the other portion of the charge consisting of the hydrochloride acid is contained in the smaller receptacle, so that it is separated from the base charge until the extinguisher is required for use, whereupon by inversion of the extinguisher or by the breaking of a seal or by the breaking of the container in which the acid is held the two portions of the charge are brought together, producing the pressure which forces the liquid from the extinguisher.

In connection with the charge above described, I prefer to employ a foam producing compound such as gogo bark (*Entada scandens*), or the like, which may be mixed with either one or both of the portions of the chemical charge, so that when the extinguisher is set off this compound will produce a thick, lathery foam having considerable inherent tenacity which will spread over the burning surfaces and facilitate the extinguishment of the fire by smothering the same, as the foam bubbles are filled with $CO_2$ which prevents combustion, and the bubbles themselves before breaking form a blanket which excludes the oxygen in the air from the burning surfaces.

It is believed that my invention, its composition and its mode of operation will be understood from the foregoing without further description, and it should also be understood that the strengths and relative proportions of the various constituents of the charge, and even the constituents themselves may be varied within considerable limits, without departing from the essence of the invention as defined in the following claims:

I claim:

1. An anti-freezing charge for fire extinguishers, comprising a solution of calcium chloride carrying in suspension a quantity of calcium carbonate.

2. An anti-freezing charge for fire extinguishers, comprising a calcium chloride solution carrying in suspension a carbonate of an alkaline earth metal.

3. An anti-freezing charge for fire extinguishers, comprising two normally separated portions, one portion consisting of calcium chloride solution and calcium carbonate and the other of hydrochloric acid.

4. An anti-freezing charge for fire extinguishers, comprising two normally separated portions, one of which consists of calcium chloride solution and calcium carbonate and the other of acid which will not produce an insoluble precipitate in the presence of calcium chloride.

5. An anti-freezing charge for fire extinguishers, comprising a portion consisting of calcium chloride and the carbonate of an alkaline earth metal, and a portion containing an acid which will not produce an insoluble precipitate in the presence of calcium chloride, and a foam producing compound mixed with one or both of said portions.

FREDERICK CREMER.